G. W. HOWELL.
Pipe-Elbows.
No. 157,449.  Patented Dec. 8, 1874.
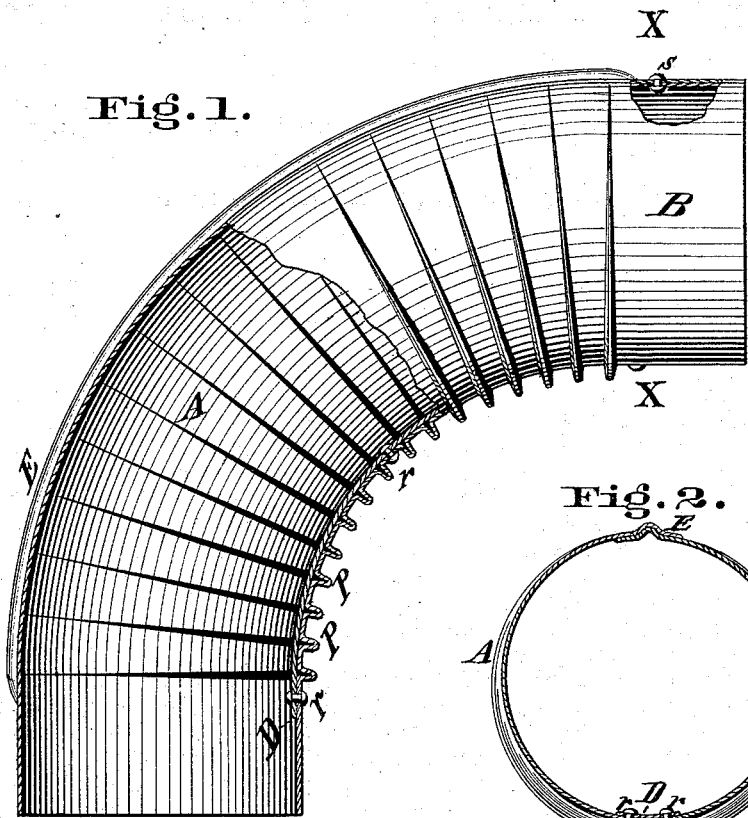
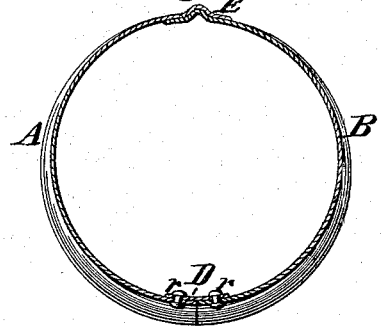
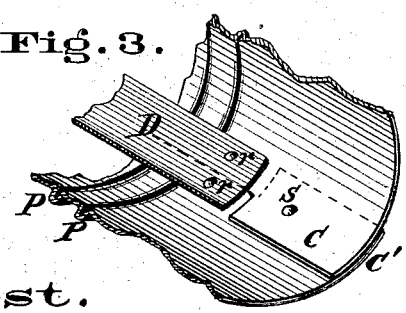
Attest.  Inventor.
John O'Gara  George W. Howell
Herman Merrell  by Wood & Boyd
  Attys.

UNITED STATES PATENT OFFICE.

GEORGE W. HOWELL, OF COVINGTON, KENTUCKY.

IMPROVEMENT IN PIPE-ELBOWS.

Specification forming part of Letters Patent No. 157,449, dated December 8, 1874; application filed April 18, 1874.

*To all whom it may concern:*

Be it known that I, GEORGE W. HOWELL, of Covington, in the county of Kenton and State of Kentucky, have invented certain new and useful Improvements in Pipe-Elbows, of which the following is a specification:

The object of my invention is to make corrugated parts or sections which may be put together so as to form an elbow, and is an improvement upon the method of uniting the parts forming the elbow shown and described in my patent of November 21, 1871, No. 121,104, all of which will be fully understood by reference to the following specification and drawing, making a part of the same, in which—

Figure 1 is a perspective view of my elbow, a portion of one section being broken off so as to show both parts. Fig. 2 is a cross-section on line $x$ $x$ of Fig. 1, and Fig. 3 shows the method of riveting the sections together.

The elbow is preferably made of two parts, A B. E represents the joint on the top or longer curve of the elbow, and is made by forming a bead or groove on each piece, as shown, the convex side of the inner bead fitting into the concave groove forming the bead of the outer part, as shown in Fig. 2. The bead or groove may be formed by any of the well-known creasing-machines. C C' represent laps on each end of the elbow, outside of the corrugations P. The two parts A B are fastened together by rivets S passing through the laps C C', or in any other appropriate manner. D represents a strip of metal placed upon the inside of the pieces A B, between the laps C C' at either end, which is fastened to the sections A B by rivets $r$ $r$. The corrugations P may be made by the machine shown in my application for patent filed August 26, 1872, or in any other convenient manner. By this mode of joining the sides A B, the corrugations P may be entirely closed, so as to form ribs, instead of being left open, as shown in the drawings. It is obvious that, instead of the laps C C', the strip D may extend the whole length of the pipe, so as to dispense with them. When the cover-joint and strengthening-strip D is to be used of a length less than the whole length of the pipe, I cut it out of the center of the sheet of metal from which the two parts A B are made, and the metal remaining in the sheet at the ends of the strip, being severed in the center, forms the laps C C'. It will thus be seen that there is no waste of metal.

Having thus described my invention, what I claim as new, and desire to secure by Letters Patent, is—

The combination of the sections A B of the elbow, constructed as herein described, with the independent metallic strip D, the whole being connected together substantially as specified.

In testimony whereof I have hereunto set my hand this 18th day of March, 1874.

GEORGE W. HOWELL.

Witnesses:
 EDWARD BOYD,
 E. E. WOOD.